United States Patent [19]

Stauffer

[11] 3,947,879

[45] Mar. 30, 1976

[54] MULTI-COLOR RECORDING MEDIUM RESPONSIVE TO FORCE FIELDS AND APPARATUS FOR RECORDING ON THE MEDIUM

[75] Inventor: Norman L. Stauffer, Englewood, Colo.

[73] Assignee: Honeywell Inc., Minneapolis, Minn.

[22] Filed: Dec. 4, 1974

[21] Appl. No.: 529,575

[52] U.S. Cl. .................................. 360/56; 346/74.1
[51] Int. Cl.[2] ....................... G11B 11/10; G11B 5/62
[58] Field of Search ............. 360/56, 110; 346/74.1; 324/38, 43

[56] References Cited
UNITED STATES PATENTS
3,320,523  5/1967  Trimble ................................ 360/56
3,683,382  8/1972  Ballinger .............................. 360/56
3,823,406  7/1974  Jeffers .................................. 360/56

*Primary Examiner*—Bernard Konick
*Assistant Examiner*—Jay P. Lucas
*Attorney, Agent, or Firm*—Arthur H. Swanson; Lockwood D. Burton; Mitchell J. Halista

[57] ABSTRACT

A multi-color recording medium responsive to a magnetic or an electrostatic recording field for recording an input signal thereon and having a continuous web of a transparent encapsulating material containing a suspension of highly reflective flakes with these flakes being selectively orientable between two incident light reflecting states. These flakes are distributed in individual micro-capsules with each capsule having a predetermined response to an applied force field to allow orientation of the suspended particles therein from one light reflecting state to another.

10 Claims, 2 Drawing Figures

MULTI-COLOR RECORDING MEDIUM RESPONSIVE TO FORCE FIELDS AND APPARATUS FOR RECORDING ON THE MEDIUM

BACKGROUND OF THE INVENTION

1. Field of the Invention

The present invention relates to a recording medium and means for recording on the recording medium. More specifically, the present invention is directed to a recording medium which responds to recording force fields in a manner corresponding to a predetermined response of portions of the recording medium exposed to the force fields.

2. Description of the Prior Art

A recording medium having a transparent web member containing a plurality of transparent capsules with each capsule containing a suspension of a plurality force field actuable, highly reflective and flake-like particles is shown in U.S. Pat. No. 3,683,382 of Dale O. Ballinger and assigned to the same assignee of the present invention. However, in that patent the recording medium is a uniformly responsive medium wherein the flakelike particles in each capsule respond to the same force field applied to the recording medium. Thus, only a single contrasting appearance, i.e., color, for the recorded area is available from that recording medium to produce a final visible record on the recording medium. In order to provide a recording medium, having an improved utility it is desirable to have a recording medium which is capable of recording in a plurality of contrasting representations, i.e., colors, on the surface of the recording medium whereby a plurality of recording traces on the recorded medium may be quickly and easily identified.

SUMMARY OF THE INVENTION

It is an object of the present invention to provide an improved force field responsive recording medium for producing a multi-color recording and recording apparatus for recording on the medium.

In accomplishing this and other objects, there has been provided, in accordance with the present invention, a recording medium having a continuous transparent web of an encapsulating material containing a plurality of individual transparent capsules with each capsule having therein a suspension of highly reflective, force field actuable, and flake-like particles. Each of the capsules is arranged to have a predetermined force field responsive characteristic whereby the recording medium may be recorded thereon with differing visual results as a consequence of the response of the flake-like particles in individual capsules to a particular force field applied to the recording medium. A recording apparatus for producing a predetermined force field to effect a desired contrast for a recording on the recording medium is correlated with the force field responsive characteristic of the resulting recording trace.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT

Figure 1:
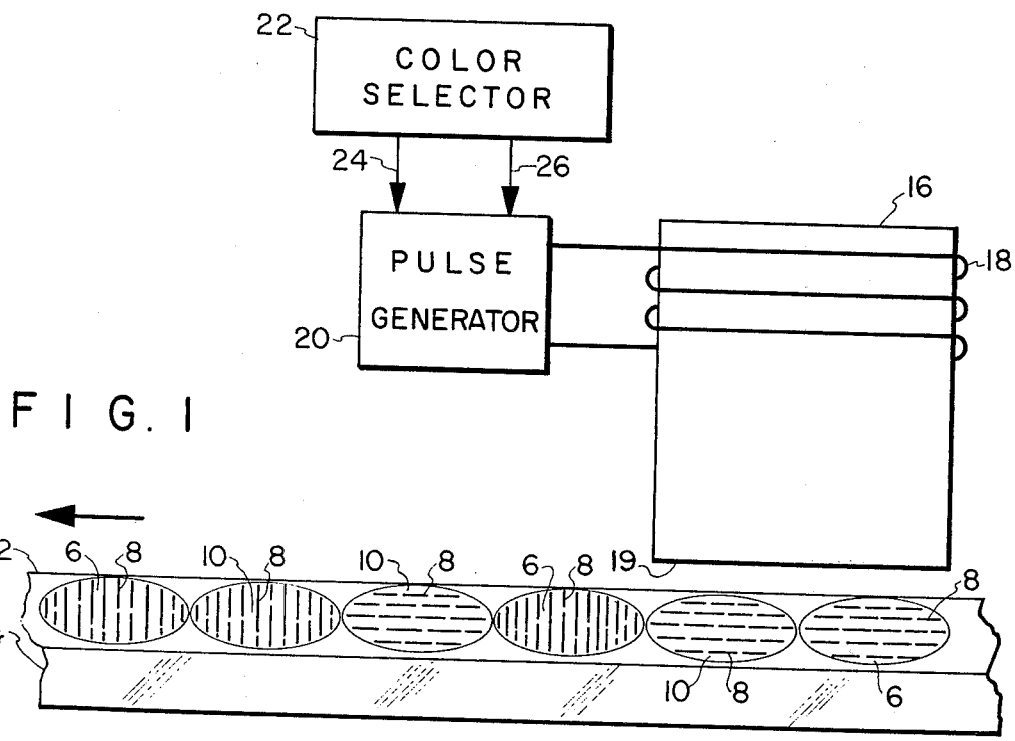
FIG. 1 is a pictorial illustration of a recording medium and recording system embodying the present invention.

Referring to FIG. 1 in more detail, there is shown a recording system having a transparent recording medium web member 2, supported on a substrate 4, with a plurality of transparent capsules containing a suspension of force-field actuable, highly reflective and flake-like particles therein. The method of making such a recording medium is generally disclosed in the aforesaid U.S. Pat. No. 3,683,382. However, in that patent, there is disclosed only a recording medium having a uniform response throughout to an applied force field wherein each of the transparent capsules contains a uniformly responsive suspension of particles. In the present invention shown in FIG. 1, the particles in one recording medium are shown as being divided into two different types. However, it is to be noted that this is merely for purposes of illustration since the number of types of capsules may be extended to additional types of capsules within a recording medium to produce additional responses to corresponding recording force fields. A first type of capsule 6 having an oil of a first viscosity suspending the flake-like particles 8 therein is arranged in juxtaposition to a second type of capsule 10 having a suspension oil of a second viscosity for suspending similar flake-like particles therein. The process for making the recording medium shown in FIG. 1 would include the step of separate encapsulation of the particles 8 in corresponding capsules with a suspension oil of a respective viscosity. Subsequently and prior to coating the capsules on the recording medium substrate 4, the capsules are mixed whereby the capsules of both oil viscosities are substantially uniformly distributed over the substrate 4 throughout the recording medium.

An apparatus for recording on the recording medium 2 is shown as a magnetic field producing means, although electrostatic field producing means may also be employed. A magnetically responsive core 16 having a winding 18 thereon is arranged with a recording end 19 adjacent to the surface of the recording medium with the recording end 19 encompassing a plurality of the capsules 6 and 10. A pulse generator 20 is connected to the winding 18 to apply a selected output signal thereto. A color selector 22, e.g., a pair of parallel switches connecting a signal source to respective output terminals, is connected to the pulse generator 20 to select an output signal from the pulse generator 20 corresponding to a desired pulse duration for application to the winding 18. The pulse generator 20 may be any suitable pulse generating circuit capable of supplying a plurality of output signals with each output signal having a corresponding pulse width, or duration.

In operation, the different viscosity oils used in the capsules 6 and 10 are effective to produce a flake suspension which has a predetermined reaction to the duration of an applied magnetic field, i.e., a high viscosity oil requires a long duration magnetic field to be applied to the capsule to reorient the flakes 8 therein and vice versa. The flakes 8 in both types of capsules 6 and 10 are initially oriented to provide a uniform surface response of the recording medium to ambient incident radiation using, for example, the prealigning technique shown in U.S. Pat. No. 3,045,499 of Dale O.

Ballinger and assigned to the same assignee as the present application. The magnetic field used in the prealigning would, of course be selected to similarly affect both types of capsules 6 and 10. The particles 8 may be either prealigned to initially reflect incident radiation away from the recording medium while the recording process aligns the particles 8 to absorb incident radiation, or vice versa.

The color selector 22 is selectively operated to produce an output signal on one of a pair of output lines 24 and 26 to select a corresponding duration of an output signal from the pulse generator 20 for application to the winding 18. Specifically, in order to produce an orientation of the particles in the low viscosity oil, a short duration output signal from the pulse generator is applied to the winding 18. This short duration pulse affects only the particles in the low viscosity oil since the particles in the high viscosity oil do not experience a magnetic field for a time sufficient to change their initial orientation. Conversely, a different color, or contrast, recording is produced by selecting a long duration output signal from the pulse generator 20 by the color selector 22 for application to the winding 18. This long duration pulse is effective to orient not only the particles 8 in the low viscosity oil capsules 6 but also the particles 8 in the capsules 10 having a high viscosity suspension oil. This combined orientation produces a different appearance to the recorded trace which may be enhanced by coating the particles in the two different types of oils with a respective surface color during the preparation of the recording medium.

Figure 2:
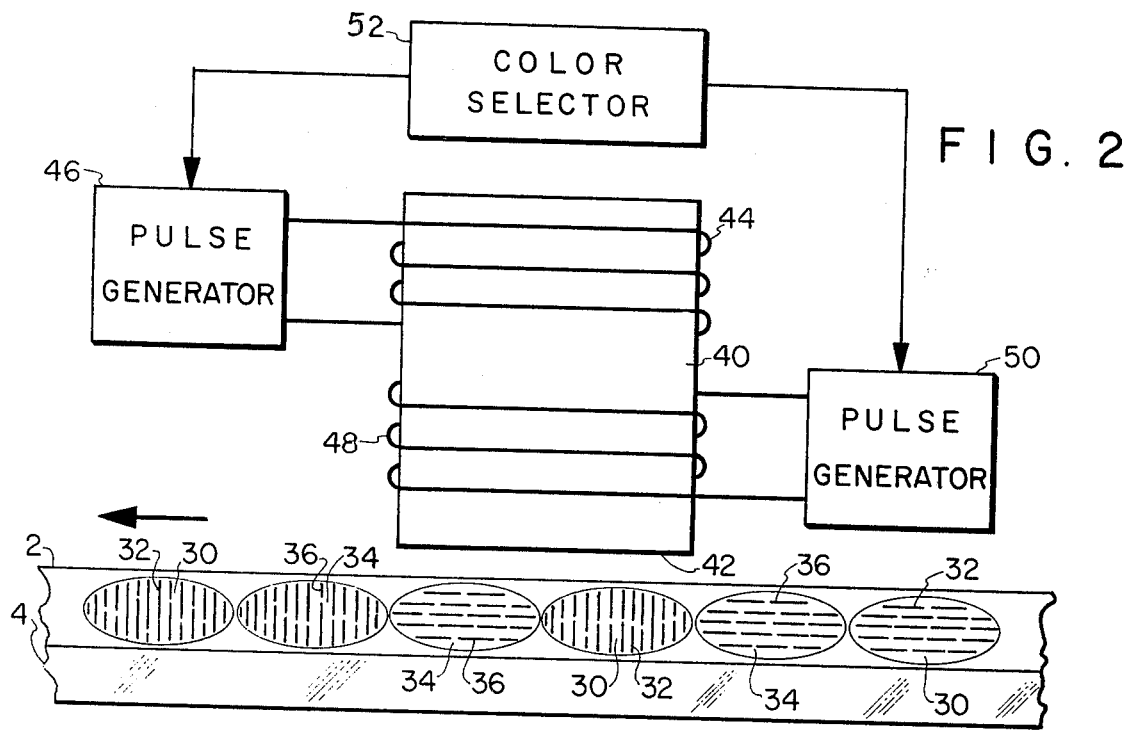
FIG. 2 is a pictorial illustration of a modification of the recording medium and recording system shown in FIG. 1 and also embodying the present invention.

In FIG. 2, there is shown a pictorial illustration of a second embodiment of the present invention wherein the particles are of a different magnetic characteristic, i.e., nickel and stainless steel. For example, using two types of particles for purposes of illustration only, the flake-like particles of a first magnetic characteristic are located in a first type of capsule 30 while particles having a second type of magnetic characteristic are located in a second capsule 34. The first particles 32 are characterized with respect to the second particles 36 in that the particles 32 have a response to a lower field strength than the particle 36 whereby a recording orientation for a recording process is achieved at a lower field strength than that required for a recording orientation of the second particles 36.

A recording apparatus suitable for recording on the recording medium has a core member 40 with a recording end 42 arranged adjacent to the recording medium. A first winding 44 is arranged on the core member 40 and is connected to the output of a first pulse generator 46. A second winding 48 is also positioned on the core member 40 and is connected to the output of a second pulse generator 50. The windings 44 and 48 are wound to produce magnetic fields which are additive to produce a combined magnetic field at the core end 42 adjacent to the recording medium. A color selector means 32, which may be similar to the color selector 22 discussed above, is connected to the pulse generator 46 and 50 to select one or both of the pulse generators to produce corresponding magnetic field strengths at the recording end 42 of the core member 40.

In operation, the particles 32 and 36 are initially prealigned as discussed above while the recording realignment is achieved by a selection of either one or both of the pulse generators 46 and 50 by the color selector 52 to provide either a low or a high magnetic field strength from the core 40, respectively. The selection of a lower field strength by the selection of one of pulse generators 46 and 50 is effective to realign the first type of magnetic particles 32 which are sensitive to a lower field strength while the particles 36 are not affected by this magnetic field strength. The selection of both of the pulse generators 46 and 50 by the color selector 52 to produce an output signal for application to their respective windings is effective to produce a higher strength magnetic field from the core member 40 and to effect a realignment of both types of the particles 32 and 36. The realignment of both types of particles is effective to produce a different appearance to the recording trace than that produced by a selection, or realignment, of only one type of particle. As in the embodiment showing FIG. 1, this appearance may be enhanced by having the surface areas of the particle exhibit different colors.

Accordingly, it may be seen that there has been provided, in accordance with the present invention, a multi-color recording medium and apparatus for recording on the recording medium.

The embodiments of the invention in which an exclusive property or privilege is claimed are defined as follows:

1. A recording medium responsive to a force field comprising:
a continuous web member, said continuous web member being formed from a transparent material having a first plurality of capsules therein and a second plurality of capsules therein, said first and second plurality of capsules being substantially uniformly mixed throughout said transparent material,
first force field responsive means responsive to a first force field in said first plurality of capsules, said first responsive means exhibiting a first response to incident electromagnetic radiation,
second force field responsive means responsive to a second force field in said second plurality of capsules, said second responsive means exhibiting a second response different from said response of said first responsive means to incident electromagnetic radiation, said first and said second force field responsive means each including highly reflective, and flake-like particles suspended within said capsules and being selectively orientable by an applied force field from a first position wherein flake-like particles scatter incident electromagnetic energy into said continuous web member into a second position wherein said flake-like particles reflect incident wave lengths of electromagnetic energy from said continuous web member thus forming a contrast between areas of said continuous web member having particles in said first orientation from areas of said continuous web member having particles in said second orientation in accordance with said first and second response to incident electromagnetic energy.

2. A recording medium as set forth in claim 1 wherein said first force field responsive means includes a suspension medium for said particles having a first viscosity and said second force field responsive means includes a suspension medium for said particles having a second viscosity different from said first viscosity.

3. A recording medium as set forth in claim 2 wherein said first and second response of said particles within said first and second capsules are respective colors.

4. A recording medium as set forth in claim 1 wherein said particles in said first force responsive means have a first force field response characteristic and said particles in said second force field responsive means have a second force field response characteristic different from said first response characteristic.

5. A recording medium as set forth in claim 1 wherein said first and second response characteristics of said particles within said first and second capsules are respective first and second colors.

6. A recorder for recording on a web member having a second and a second force field responsive means therein and including highly reflective and flake-like particles suspended within said web member in said first and second means, said first and second means responding to first and second force fields respectively to produce a reorientation of said particles from a first position to a second position and said particles within said first means having a response characteristic to incident electromagnetic energy different from a response characteristic of particles in said second means comprising means for generating said first force field in said first and second means, means for generating said second force field in said first and second means, and means for selectively energizing said last two-mentioned means.

7. A recorder as set forth in claim 6 wherein said first force field has a field strength different from said second force field.

8. A recorder as set forth in claim 6 wherein said first force field has a longer duration than said first force field.

9. A recorder as set forth in claim 6 wherein said first and said second force fields are magnetic fields.

10. A recorder as set forth in claim 6 wherein said first and second response of said particles within said first and second means are respective colors.

* * * * *